United States Patent [19]

Hu

[11] Patent Number: 5,262,680

[45] Date of Patent: Nov. 16, 1993

[54] SWITCH CONTROL APPARATUS FOR ELIMINATING INTERMITTENT ON/OFF CONDITION ON A POWER SUPPLY SWITCH

[75] Inventor: Tien-Cheng Hu, Hsinchu, Taiwan

[73] Assignee: Industrial Technology Research Institute, Taiwan

[21] Appl. No.: 726,456

[22] Filed: Jul. 8, 1991

[51] Int. Cl.⁵ .............................................. H01H 83/14
[52] U.S. Cl. ...................................... 307/130; 361/21; 322/8
[58] Field of Search .................. 361/21, 33, 90; 322/8; 307/125, 130, 131, 126

[56] References Cited

U.S. PATENT DOCUMENTS

| | | | |
|---|---|---|---|
| 3,248,608 | 4/1966 | Farkas et al. | 361/21 |
| 3,611,162 | 10/1971 | Tochitani | 328/150 |
| 4,262,214 | 4/1981 | Patel | 307/51 |
| 4,268,787 | 5/1981 | Sloan | 322/8 |
| 4,541,029 | 9/1985 | Ohyama | 361/31 |
| 4,584,623 | 4/1986 | Bello et al. | 361/90 |
| 5,149,985 | 9/1992 | Fujiwara | 307/10.7 |

Primary Examiner—Jeffrey A. Gaffin
Attorney, Agent, or Firm—Townsend and Townsend Khourie and Crew

[57] ABSTRACT

Disclosed is an apparatus for controlling a solenoid switch connecting a power supply to a load. The apparatus constantly monitors the level of output voltage of the power supply, and accordingly controls the engagement or disengagement of the solenoid switch. Initially at the time the power switch is just turned on, the solenoid switch would not be engaged until the voltage has reached a predetermined level. After the solenoid switch is engaged and power is delivered to the load, the apparatus would disengage the solenoid switch when the voltage level of the power supply goes beyond an upper limit or below a bottom limit. Utilizing the apparatus, the power input to the load can be kept in a desired range.

2 Claims, 7 Drawing Sheets

5,262,680

SWITCH CONTROL APPARATUS FOR ELIMINATING INTERMITTENT ON/OFF CONDITION ON A POWER SUPPLY SWITCH

BACKGROUND OF THE INVENTION

The present invention relates to an apparatus for controlling a switch connecting a power supply to a load. More particularly, the apparatus controls the switch based on the output voltage levels of the power supply.

Referring to FIG. 1, there is shown a schematic diagram of a prior art. The prior art connects the coil 3 of a solenoid switch 2 directly to the power line. Due to the characteristics of the electromagnet in the solenoid switch 2, the solenoid switch 2 would be engaged when the output voltage of the power supply 1 has reached 65-75% of the rating value. The solenoid switch 2 is in a holding state after being engaged. In the holding state, the silicon steel magnetic cores come in contact with each other such that the gap therebetween is reduced and whereby the magnetic reluctance thereof is decreased. Therefore, the solenoid switch 2 would be disengaged only when the output voltage of the power supply 1 has dropped below 35-40% of the rating value.

Since the solenoid switch would be engaged when the output voltage of the power supply has reached 65-75% of the rating value, the power received by the load at this instant is thus 25-35% lower than its rating value. This low power may drive the load in an inadequate manner and somehow cause certain adverse effects to the load.

Moreover, in some cases, the voltage input to the load may become overhigh to the load. Should this happens, the solenoid switch should be disengaged to cut off the power. Unfortunately, the prior art is not capable of doing so. Therefore, under such a condition, the load would run a risk of being damaged by the overhigh voltage.

SUMMARY OF THE INVENTION

It is therefore a primary object of the present invention to provide an apparatus which constantly monitors the level of the output voltage of the power supply, and accordingly controls the engagement or disengagement of the solenoid switch. Initially at the time the power switch is just turned on, the solenoid switch would not be engaged until the voltage has reached a predetermined level. After the solenoid switch is engaged and power is delivered to the load, the apparatus would continue to monitor the voltage level of the power supply. If the voltage level is detected to go beyond an upper limit or below a bottom limit, the apparatus would disengage the solenoid switch to cut off the power delivering to the load.

BRIEF DESCRIPTION OF THE DRAWINGS

A better understanding of the present invention can be more easily achieved by a reading to the subsequent detailed description of a preferred embodiment with references made to the accompanying drawings, wherein.

DETAILED DESCRIPTION OF A PREFERRED EMBODIMENT

Figure 1:
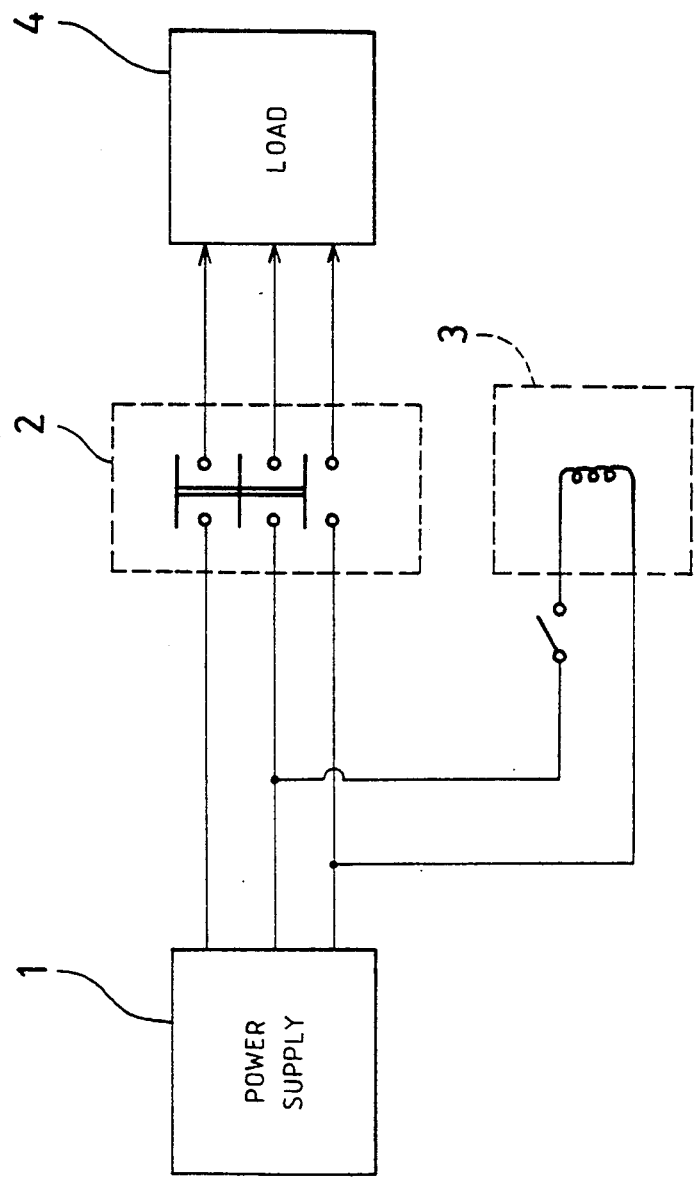
FIG. 1 is a schematic diagram of a prior art.
Figure 2:
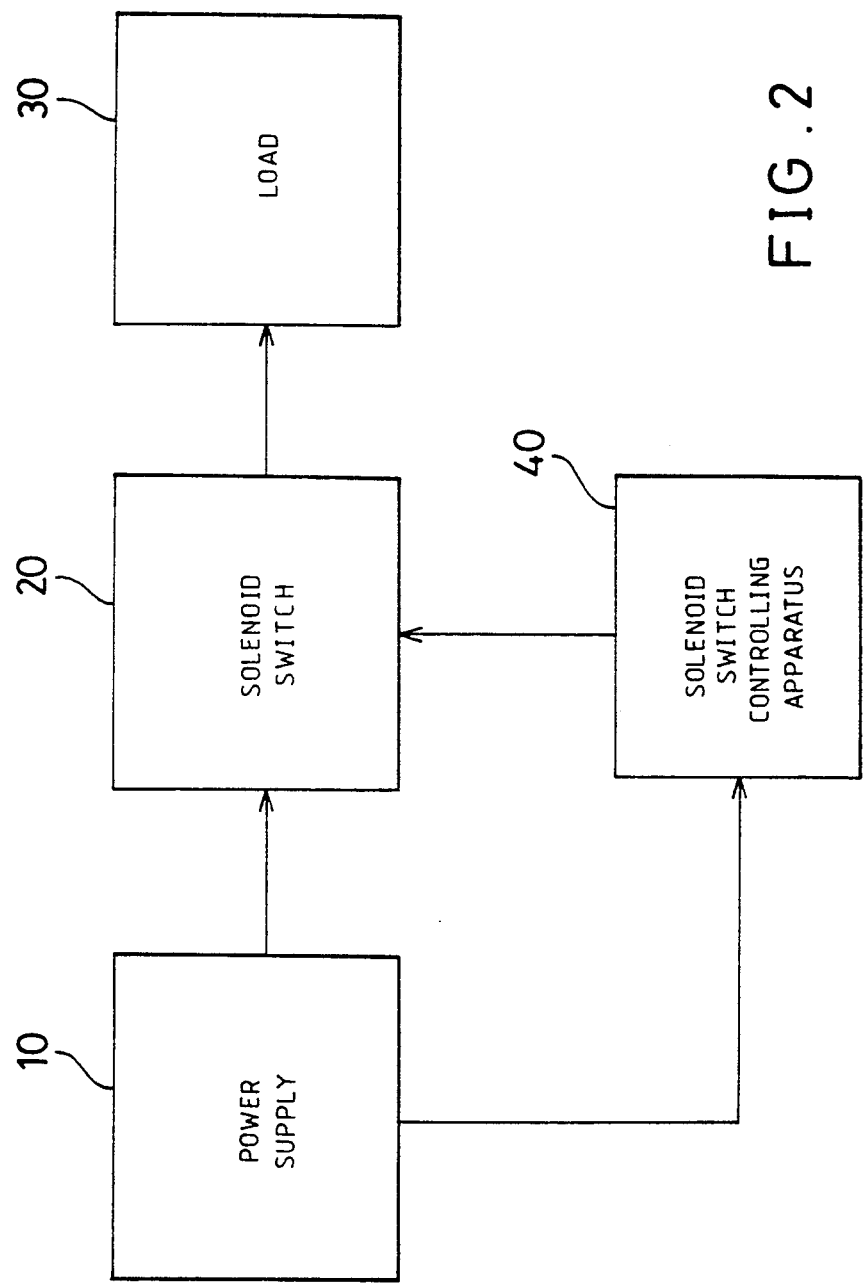
FIG. 2 is a schematic block diagram of the present invention.

Referring to FIG. 2, there is shown a schematic block diagram of a preferred embodiment according to the present invention. The principle of the present invention will be explained with a reference to the schematic block diagram. As shown, a solenoid switch 20 is connected between a power supply 10 and a load 30. In accordance with the present invention, initially as the switch of the power supply 10 is just turned on, the solenoid switch 20 would not be engaged until the output voltage of the power supply 10 has reached a predetermined level of $V_E$. After the solenoid switch 20 has been engaged and the power supply 10 begins to deliver power to the load 30, the apparatus 40 according to the present invention continues to monitor the level of the output voltage of the power supply 10. If the level of the output voltage of the power supply is detected to be higher than a predetermined upper limit $V_O$, or lower than a predetermined lower limit $V_R$, the apparatus 40 would make the solenoid switch 20 disengaged to cut off the power delivering to the load 30. The relationship of $V_E$, $V_O$, and $V_R$ is $V_O > V_E > V_R$.

Figure 3:
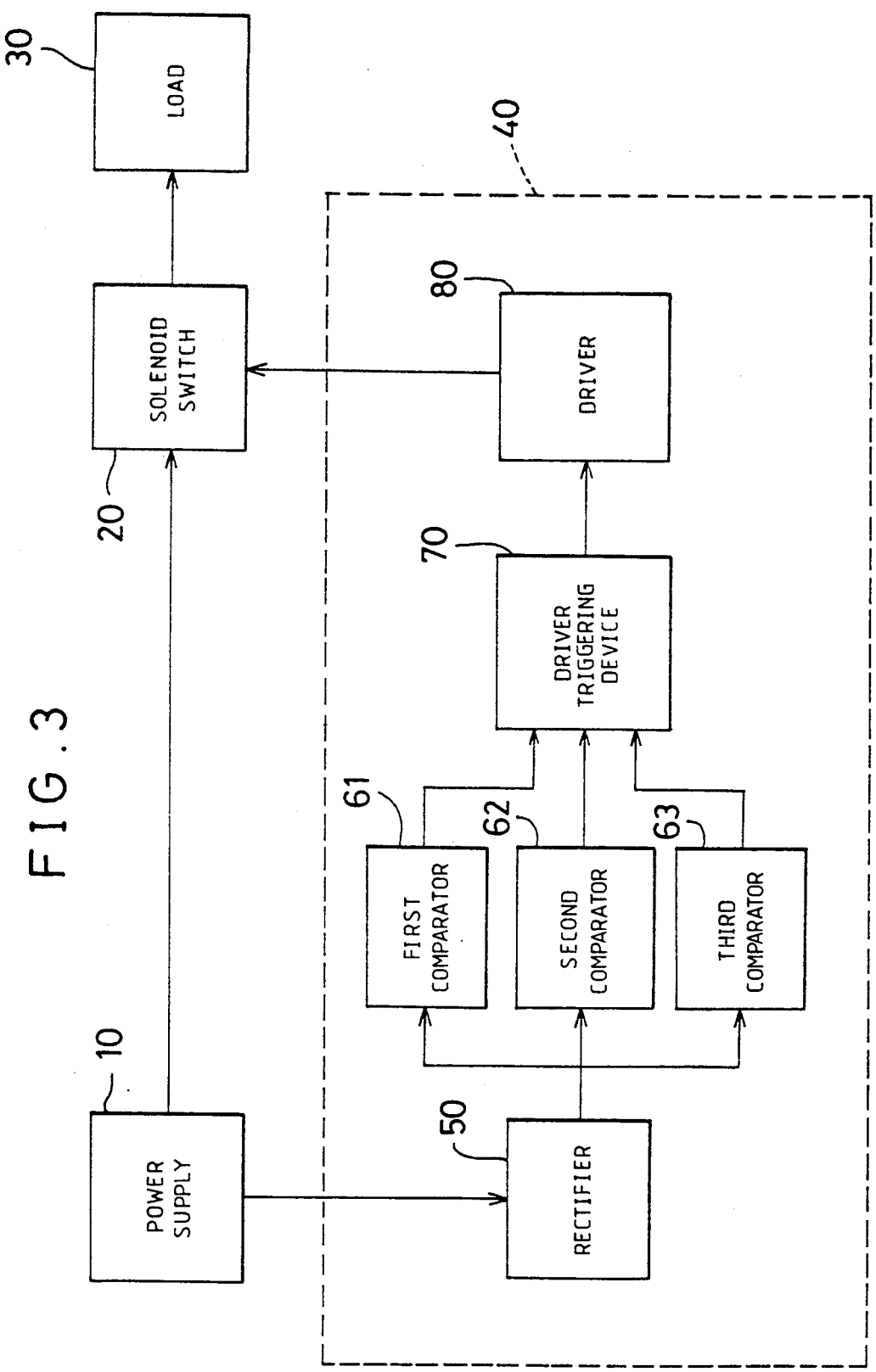
FIG. 3 is a block diagram of a preferred embodiment of the apparatus according to the present invention.

Referring to FIG. 3, a detailed block diagram shows a preferred embodiment of the apparatus 40. The apparatus 40 comprises a rectifier 50, three comparators 61, 62, 63, a driver triggering device 70, and a driver 80. Their working principles and functions will be discuss respectively hereinafter.

1. The Rectifier

Figure 4:
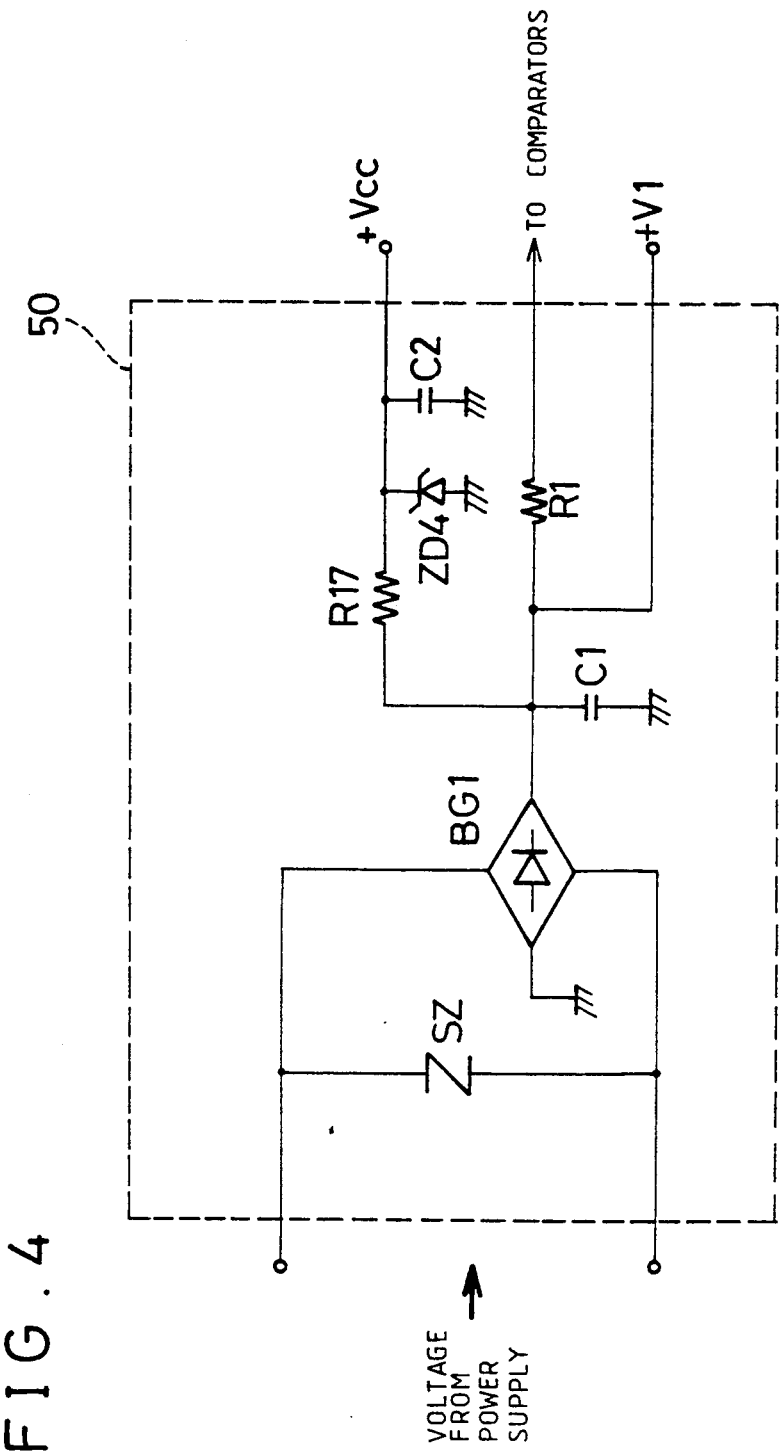
FIG. 4 is a circuit diagram of a rectifier utilized in the preferred embodiment of the present invention.

Referring to FIGS. 3 and 4, the rectifier 50 used in the preferred embodiment is a bridge rectifier comprising four diodes. The rectifier 50 is thus able to be coupled to either a DC power supply or an AC power supply. If the rectifier 50 is coupled to a DC power supply, the anode or the cathode of the DC power supply can be connected to either input ports of the rectifier 50. If the rectifier 50 is coupled to an AC power supply, the output thereof would be a high DC voltage. The rectifier 50 can also be coupled to any two power lines of a 3-phase power source. Thus, the present invention can be utilized in almost any kind of power supply.

A resistor R1 in the rectifier is used to lower the value of the high DC voltage to an appropriate one for the comparators 61, 62, 63. Another resistor R17 and a Zener diode ZD4 are used to provide a working voltage Vcc for driving the comparators 61, 62, 63 and the driver triggering device 70. A DC output voltage $V_1$ is used to drive the driver 80.

2. THE COMPARATORS

Figure 5:
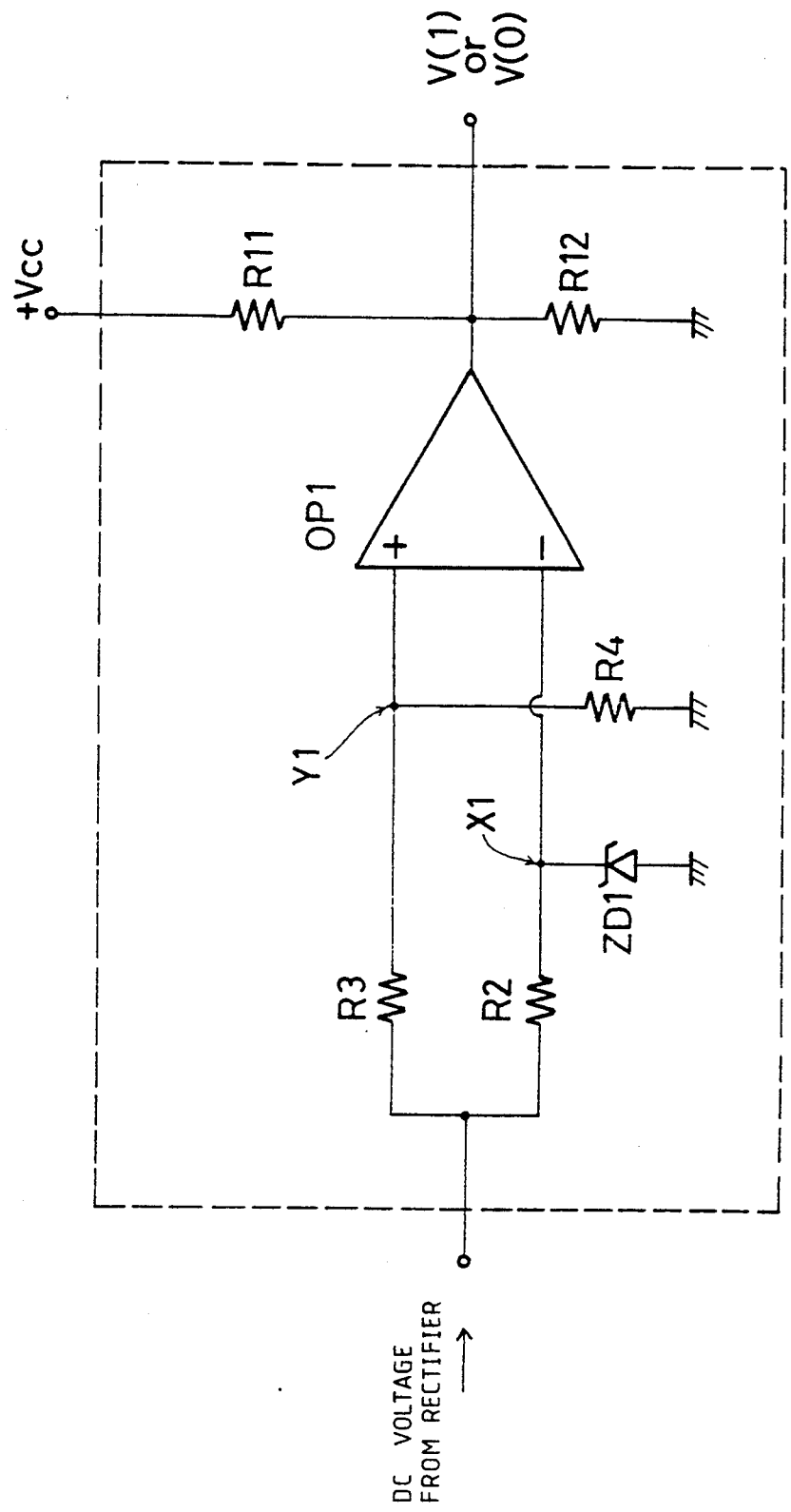
FIG. 5 is a circuit diagram of a comparator utilized in the preferred embodiment of the present invention.

Three comparators 61, 62, 63 are utilized in the embodiment for detecting the voltage level of the power supply 10. The circuit configurations of the three comparators 61, 62, 63 are substantially the same. Referring to FIG. 5, there is shown a comparator circuit diagram.

The Zener diode ZD1 is utilized as a voltage regulator such that at a point x1 the voltage drop thereof would be kept at a constant. This constant voltage drop is therefore used as a reference voltage to be compared with by the comparator. The resistor R3 and R4 act as a divider for the output DC voltage of the rectifier 50 such that the voltage at a point y1 is in a constant proportion to the output voltage of the power supply. If the voltage drop at the point y1 is equaled to or greater than that at the point x1, the comparator would output a high voltage V(1). Otherwise, the comparator would output a low voltage V(0). Fundamentally, the comparator is used as a one-bit analog-to-digital convertor. The high voltage represents a digital output of 1, and the low voltage represents a digital output of 0.

The circuit diagrams of the three comparators differ only in the values of the resistors and their working principles are all the same. The circuit of the first comparator 61 is arranged in such a way that if the voltage level of the power supply 10 is equaled to $V_E$ or above, then the output of the first comparator 61 would be V(1), otherwise the output would be V(0). Similarly, the circuit of the second comparator 62 is arranged in such a way that if the voltage level of the power supply 10 is above $V_O$, then the output of the second comparator 62 would be V(1), otherwise the output would be V(O); and the circuit of the third comparator 63 is arranged in such a way that if the voltage level of the power supply 10 is above $V_R$, then the output of the third comparator 63 would be V(1), otherwise the output would be V(O).

3. THE DRIVER TRIGGERING DEVICE

The driver triggering device 70 is a logic circuit. Based on the digital inputs from the three comparators 61, 62, 63, if in a case the solenoid switch 20 should be engaged, the output of the driver triggering device 70 would be a digit 1, otherwise the output would be a digital 0. Let the digital output of the comparators 61, 62, 63 be designated A, B, C respectively and the digital output of the driver triggering device 70 be designated Q, then according to the concept of the present invention the voltage level $V_{in}$ and Q should have the following relationships:

(1) Initially the power switch is just turned on, if $V_{in} < V_E$, then Q=0; and if $V_{in} < V_E$, then Q=1.

(2) after the solenoid switch 20 is engaged, i.e. after Q has been switched from 0 to 1,

| if $V_R < V_E < V_O$, | then Q = 1; |
| if Vin > $V_O$, | then Q = 0; and |
| if Vin < $V_R$, | then Q = 0. |

The comparators 61, 62, 63 will respond to the output voltage $V_{in}$ of the power supply 10 in the following manner:

| when $V_{in} < V_R$, | A = 0, B = 0, C = 0; |
| when $V_R < V_{in} < V_E$, | A = 0, B = 0, C = 1; |
| when $V_E < V_{in} < V_O$, | A = 1, B = 0, C = 1; and |
| when $V_O < V_{in}$, | A = 1, B = 1, C = 1. |

Summing up the above, the truth table for A, B, C, and Q is given below.

| | A | B | C | Q |
|---|---|---|---|---|
| 1. $V_{in} < V_R$ | 0 | 0 | 0 | 0 |
| 2. $V_{in} > V_E$ | 1 | 0 | 0 | 1 |
| 3. $V_R < V_{IN} < V_E$ | 0 | 0 | 1 | 1 |
| 4. $V_E < V_{IN} < V_O$ | 1 | 0 | 1 | 1 |
| 5. $V_{in} > V_O$ | 1 | 1 | 1 | 0 |
| 6. $V_{in} > V_R$ | 0 | 0 | 0 | 0 |

Figure 6:
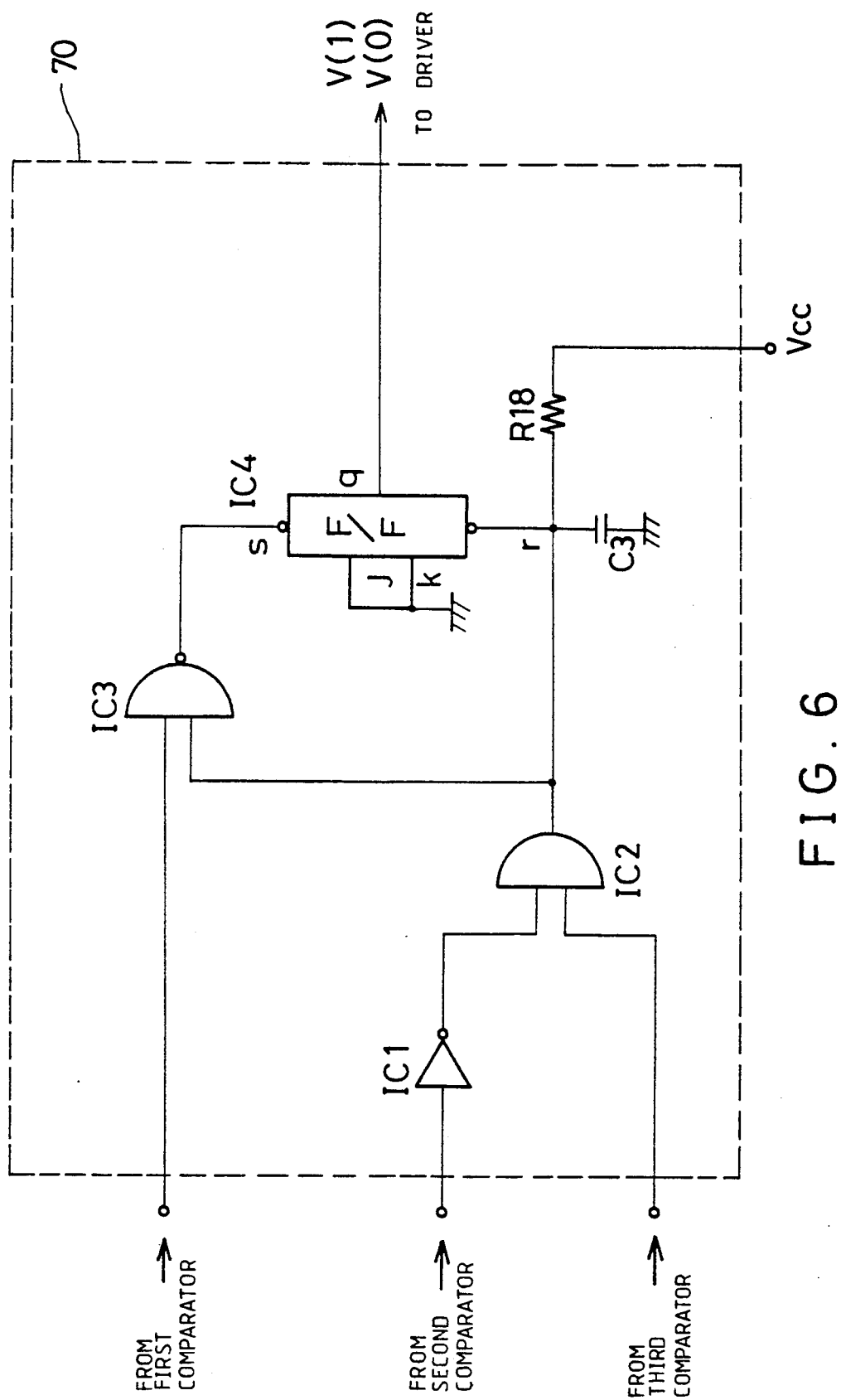
FIG. 6 is a circuit diagram of a driver triggering device utilized in the preferred embodiment of the present invention.

A logic circuit which will implement the above truth table is shown in FIG. 6; wherein IC1 is an inverter; IC2 is and AND gate; IC3 is a NAND gate; and IC4 is a J-K flip-flop. At the initial stage the power switch is just turned on, an integral circuit comprising a resistor R18 and a capacitor C3 is capable of ensuring the output of the driver triggering device 70 at a low voltage level (i.e. Q=0) such that the driver 80 would not be actuated to engage the solenoid switch 20.

4. THE DRIVER

Figure 7:
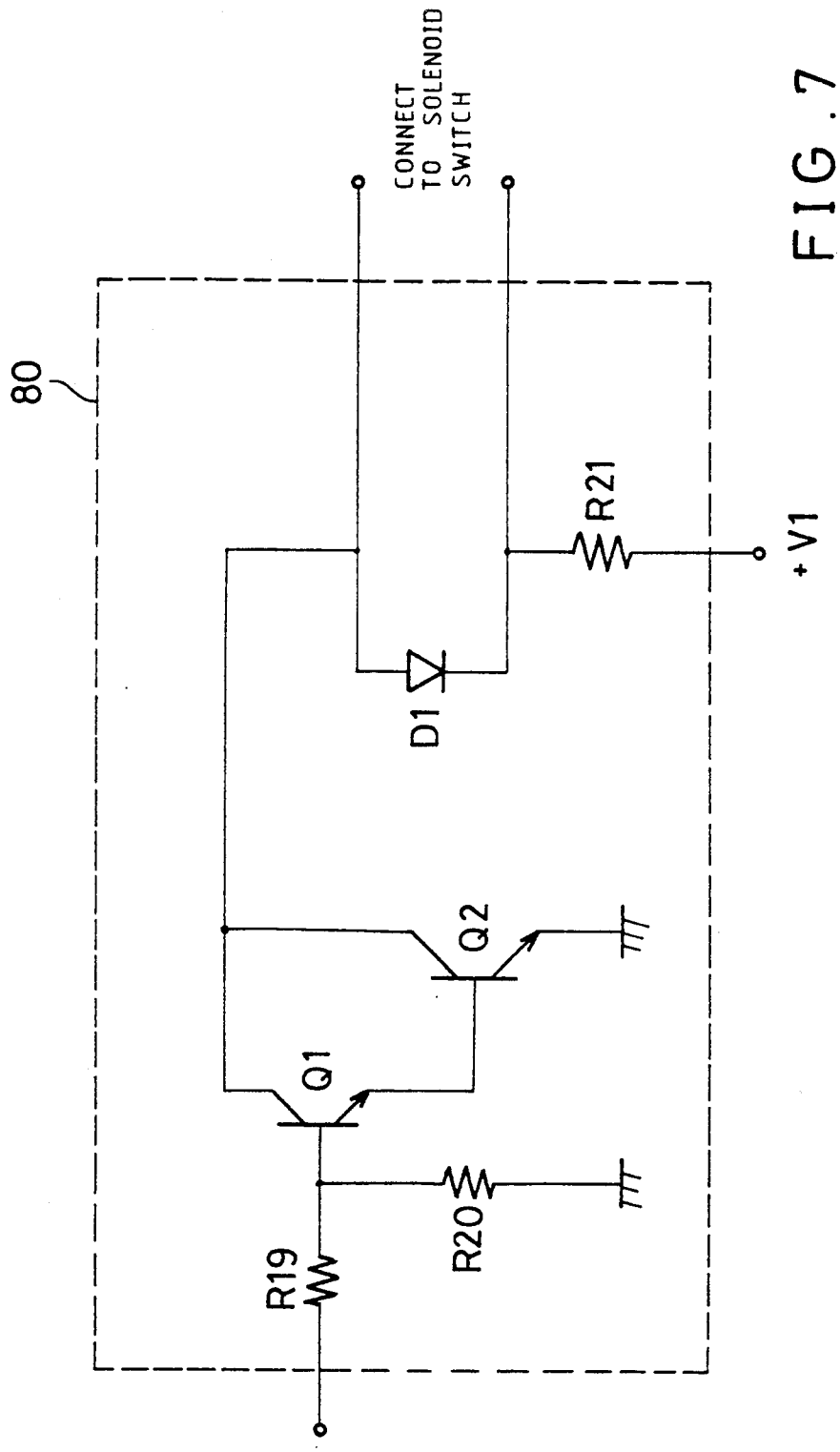
FIG. 7 is a circuit diagram of a driver utilized in the preferred embodiment of the present invention.

Referring to FIG. 7, there is shown a preferred circuit diagram for the driver 80. The circuit utilizes a Darlington pair transistor Q1 and Q2. When the digital output of the driver triggering device 70 is 0, the Darlington pair will become a high impedance open circuit and thus no current is delivered to the solenoid switch 20. Otherwise, when the output is 1, the high voltage will trigger the Darlington pair transistors Q1 and Q2 such that the circuit becomes a low impedance close circuit and thereby delivers a current to the solenoid switch 20.

Compared with the prior art, the apparatus according to the present invention is capable of starting the delivery of the power to the load only when the output voltage has reached a predetermined level, and cutting off the power delivering to the load if the voltage level is beyond a predetermined upper limit or below a predetermined bottom limit. The starting level, the upper limit level, and the bottom limit level all can be predetermined at an arbitrary value depending on the specification of the load.

While the present invention has been described in terms of preferred embodiments, it is to be understood that the present invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. In a power system including a solenoid switch connecting a power supply to a load, an apparatus for controlling the on/off of the solenoid switch, comprising:

voltage magnitude detection means, coupled to the power supply, for defining three voltage levels V1, V2, and V3, and a corresponding four voltage ranges, a first range below V1, a second range between V1 and V2, a third range between V2 and V3, and a fourth range above V3, and for detecting a voltage magnitude of the power supply;

logic means, coupled to said voltage magnitude detection means, for responding to a change in said power supply voltage magnitude, and for registering a change in said power supply voltage magnitude from one of said voltage ranges to another; and switch control means, coupled to said voltage magnitude detection means and said logic means, for controlling the on/off of the solenoid switch, wherein,
 (a) the solenoid switch is off when said power supply voltage magnitude is within said first range,
 (b) the solenoid switch is off when said power supply voltage magnitude changes from said first to said second range and remains off in said second range,
 (c) the solenoid switch turns on when said power supply voltage magnitude changes from said second range to said third range, and remains on in said third range; and
 (d) the solenoid switch is on when said power supply voltage magnitude changes from said third range to said second range, and remains on in said second range.

2. The apparatus of claim 1 wherein said switch control means turns the solenoid switch off when said power supply voltage magnitude is within said fourth range.

* * * * *